(12) United States Patent
Kobayashi et al.

(10) Patent No.: US 9,056,375 B2
(45) Date of Patent: Jun. 16, 2015

(54) MANUFACTURING METHOD FOR BEARING OUTER RING

(71) Applicant: NSK, Ltd., Tokyo (JP)

(72) Inventors: Kazuto Kobayashi, Kanagawa (JP); Hiroshi Koyama, Kanagama (JP)

(73) Assignee: NSK, Ltd. (JP)

( * ) Notice: Subject to any disclaimer, the term of this patent is extended or adjusted under 35 U.S.C. 154(b) by 0 days.

(21) Appl. No.: 14/151,272

(22) Filed: Jan. 9, 2014

(65) Prior Publication Data
US 2015/0068264 A1  Mar. 12, 2015

Related U.S. Application Data

(60) Continuation-in-part of application No. 13/585,878, filed on Aug. 15, 2012, now abandoned, and a division of application No. 12/522,311, filed on Dec. 2, 2009, now Pat. No. 8,424,208.

(30) Foreign Application Priority Data

Jan. 9, 2014  (JP) .................................. 2014-002273

(51) Int. Cl.
*B21D 53/10* (2006.01)
*B23P 15/00* (2006.01)
(Continued)

(52) U.S. Cl.
CPC .......... *B23P 15/003* (2013.01); *Y10T 29/49636* (2015.01); *Y10T 29/49643* (2015.01);
(Continued)

(58) Field of Classification Search
CPC ........ B23P 15/003; B21K 1/04; B21K 21/02; B21H 1/12; B21J 1/06; B21J 1/04; B21J 5/10; B21J 5/02; F16C 33/64; F16C 19/184; Y10T 29/49636; Y10T 29/49643

USPC ............. 29/898.04, 898.06, 898.066, 898.09; 384/492, 513, 569; 72/256, 356
See application file for complete search history.

(56) References Cited

U.S. PATENT DOCUMENTS 3,769,671 A * 11/1973 Knapp ..................... 29/898.066
6,055,838 A *  5/2000 Ohama et al. .................. 72/356
(Continued)

FOREIGN PATENT DOCUMENTS

JP  2005180627 A *  7/2005
JP  2006220221 A *  8/2006

*Primary Examiner* — Sarang Afzali
*Assistant Examiner* — Ruth G Hidalgo-Hernande
(74) *Attorney, Agent, or Firm* — Hartman Global IP Law; Gary M. Hartman; Michael D. Winter

(57) ABSTRACT

When the column-shaped raw material 10 is subjected to an upsetting process, a simultaneous forward-backward extrusion process, a punching process, a rolling process and a finishing process in order, to obtain an outer ring 3 that constitutes a back-to back double-row angular ball bearing 3, in the simultaneous forward-backward extrusion process, using a floating die 31 having a bottom plate section 35 with a circular convex section 34 and a punch 33 having a punch side convex section 37 provided on an distal end thereof, the section closer to the center in the radial direction of the first intermediate material 11*a* is compressed in the axial direction, causing the metal material of the first intermediate material 11*a* to move outward in the radial direction and move approximately uniformly in both extrusion (forward and backward) direction of the punch 33, whereby the middle metal material 29 having a high degree of cleanliness of the column-shaped raw material 10 is exposed over the entire portion that will become the double-row outer-ring raceways 2.

6 Claims, 10 Drawing Sheets

(51) Int. Cl.
- *B21J 1/06* (2006.01)
- *F16C 33/64* (2006.01)
- *F16C 19/18* (2006.01)
- *B21J 1/04* (2006.01)
- *B21K 21/02* (2006.01)
- *B21K 1/04* (2006.01)

(52) U.S. Cl.
CPC *B21J 1/06* (2013.01); *F16C 33/64* (2013.01); *F16C 19/184* (2013.01); *B21J 1/04* (2013.01); *B21K 21/02* (2013.01); *B21K 1/04* (2013.01)

(56) References Cited

U.S. PATENT DOCUMENTS

| | | | |
|---|---|---|---|
| 7,000,319 B2 * | 2/2006 | Iihara et al. | 29/898 |
| 7,090,729 B2 * | 8/2006 | Oohama et al. | 148/246 |

* cited by examiner

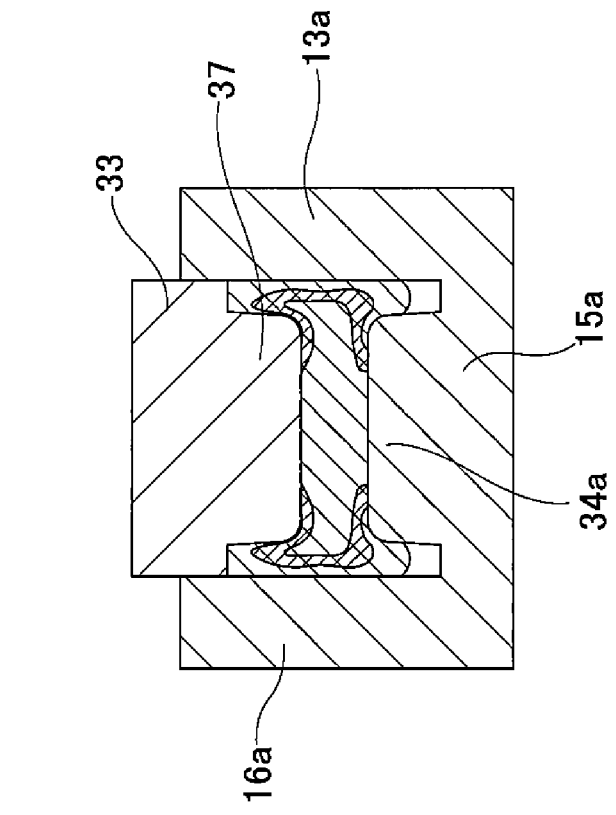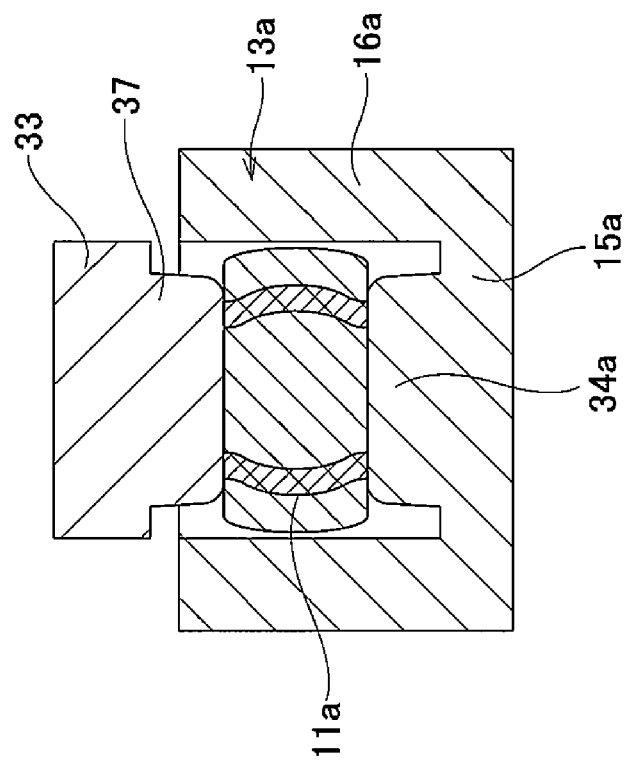

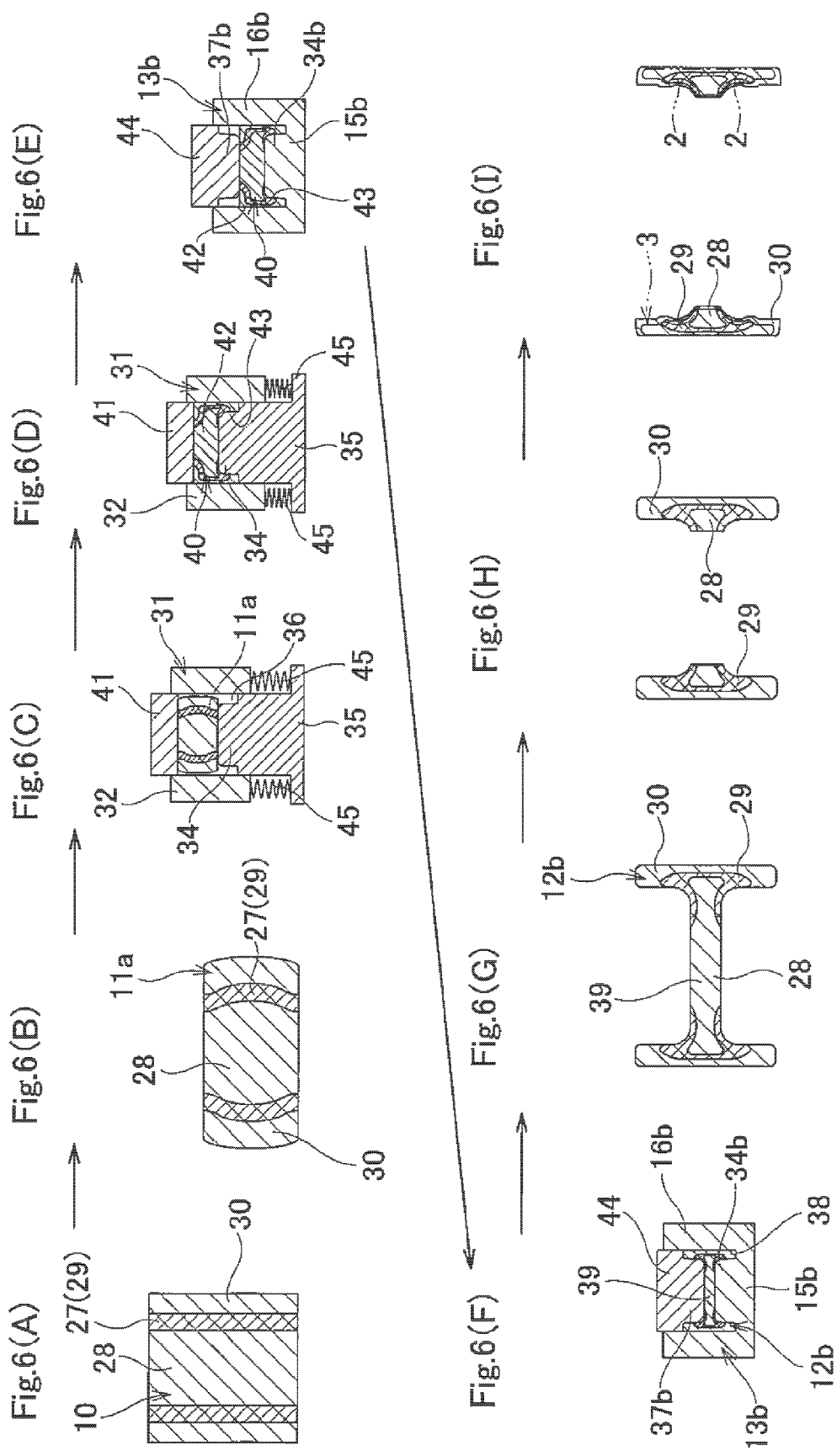

MANUFACTURING METHOD FOR BEARING OUTER RING

TECHNICAL FIELD

The present invention relates to a manufacturing method for a bearing outer ring which constitutes a double-row angular rolling bearing incorporated into the rotating support sections of a variety of machinery including automobiles, machine tools, and industrial machinery.

BACKGROUND ART

In order to construct a rotating support section for a variety of machinery, a back-to-back double-row angular ball bearing 1 such as shown in FIG. 7 is widely used. This double-row angular ball bearing 1 has; an outer ring 3 having double-row outer ring raceways 2 on the inner peripheral surface, a pair of inner rings 5 each having an inner ring raceway 4 on the outer peripheral surface, a plurality of balls 6 provided so as to freely roll between the double-row outer ring raceways 2 and the inner ring raceways 4 of the pair of inner rings 5, and a pair of cages 7 for holding the balls 6. In such a double-row angular ball bearing 1, for example, the outer ring 3 is fitted into a housing 8, and the pair of inner rings 5 are fitted onto a rotating shaft 9. The rotating shaft 9 is rotatably supported inside the housing 8.

The outer ring 3 and the pair of inner rings 5 which constitute such a double-row angular ball bearing 1 are processed to a predetermined shape and size by, for example, performing a forging process, a rolling process, machining process and grinding process in the well-known manner described in JPH09-176740, JPH09-280255, JPH11-140543, JP2002-079347, JP2003-230927 and the like. For example, the outer ring 3 is conventionally manufactured by the processes shown in FIG. 8. First, this conventional manufacturing method for a bearing outer ring is described.

In the conventionally known manufacturing method of a bearing outer ring shown in FIG. 8 (A) to FIG. 8 (F), first a columnar raw material 10 as shown in FIG. 8 (A) is obtained by cutting a long piece of a raw material into predetermined lengths. The size of the raw material 10 is determined according to the type of bearing outer ring, however, normally, the ratio of the diameter to the axial length is approximately 5:4 to 5:6.

Next, the raw material 10 is subjected to an upsetting process by compressing the raw material 10 in the axial direction between opposing pressing surfaces of a pair of dies, to obtain a first intermediate material 11 whose outer peripheral surface is a convex circular arc as shown by FIG. 8 (B). Normally, the first intermediate material 11 is such that the axial length is compressed to 70 percent or less of the axial length of the raw material 10.

Next, this first intermediate material 11 is subjected to a backward extrusion process shown by FIG. 8 (C) to FIG. 8 (D) to obtain a second intermediate material 12 shown by FIG. 8 (D).

The backward extrusion process is performed by compressing the center section in the radial direction of the first intermediate material 11 in the axial direction, between a die 13 and a punch 14, and plastically deforming the section closer to the outside in the radial direction in a direction opposite to the pushing direction of the punch 14. The die 13 has a bottomed cylindrical shape, and is provided with a circular base plate portion 15 and a peripheral wall portion 16 which extends upward from the outer peripheral edge section of the base plate portion 15. An annular groove 17 is formed around the entire periphery of the section closer to the outside in the radial direction of the base plate portion 15. The inner peripheral surface of the peripheral wall portion 16 has a stepped shape in which an inner periphery large diameter portion 18 on the opening side (from the center section to the top end section) is connected to an inner periphery small diameter portion 19 on the base plate 15 side (in the bottom end section) through an inner periphery inclined portion 20 in the center section in the axial direction. The inner periphery small diameter portion 19 is positioned upon the same cylindrical surface as the inner peripheral surface on the outer-diameter side of the annular groove 17. The outer peripheral surface of the punch 14 also has a stepped shape in which an outer periphery small diameter portion 21 in the section closer to the distal end (the lower half section) is connected to an outer periphery large diameter portion 22 in the section closer to the base end (the upper half section) through an outer periphery inclined portion 23 in the center section in the axial direction. The die 13 and the punch 14 having these respective constructions are concentrically secured to and supported by a table and ram of a pressing machine. In other words, the die 13 is secured to the top surface of the table and the punch 14 is secured to the bottom end face of the ram.

When performing this backward extrusion process, with the punch 14 and the ram in an elevated state, the first intermediate material 11 is set inside the die 13. In the case of the conventional manufacturing method, the outer diameter of the first intermediate material 11 is smaller than the inner diameter of the inner periphery small diameter portion 19, at least part of the section closer to the bottom end which enters inside the inner periphery small diameter portion 19. Accordingly, in a state with the first intermediate material 11 set inside the die 13, the bottom surface of the first intermediate material 11 comes into contact with the radially inside section with respect to the annular groove 17 of the top surface of the base plate 15, as shown by FIG. 8 (C). Then from this state, the punch 14 is lowered by the ram, thereby compressing the center portion of the first intermediate material 11 in the axial direction between the distal end surface of the punch 14 and the top surface of the base plate 15 of the die 13, as shown by FIG. 8 (D).

The metal material which is extruded radially outward from the space between the top surface of the base plate 15 and the distal end surface of the punch 14 by this compressing action, moves in the opposite direction (upward) to the pushing direction of the punch 14, together with the metal material present in the section closer to the outside in the radial direction of the first intermediate material 11. Thus, the metal material which moves in the opposite direction to the pushing direction of the punch 14 follows the shape of the outer peripheral surface of the punch 14 and the inner peripheral surface of the peripheral wall portion 16 to form a stepped cylinder of which the inner and outer peripheral surfaces are constructed by stepped cylindrical surfaces. Furthermore, part of the metal material enters inside the annular groove 17, so that the shape of this portion becomes a rim shape. By the backward extrusion process performed in this manner, a second intermediate material 12 is obtained with the overall shape of a bottomed cylinder in which the inner and outer peripheral surfaces are constructed by stepped cylindrical surfaces as shown by FIG. 8 (D). The thickness in the axial direction of the base portion 24 of the second intermediate material 12 is approximately 10% to 20% of the axial length of the first intermediate material 11. Moreover, the thickness in the radial direction of the cylindrical portion of the second intermediate material 12 is approximately 15% to 25% of the diameter of the first intermediate material 11.

Next, this second intermediate material 12 is subjected to a punching process which punches out a base portion 24 of the second intermediate material 12, to produce a third intermediate material 25 with the shape of a stepped cylinder as shown by FIG. 8 (E). This punching process is performed by using a pressing machine to drive a blanking punch through the second intermediate material 12.

After the third intermediate material 25 is produced in this manner, the third intermediate material 25 is subjected to a cold rolling forming (CRF) to produce a fourth intermediate material 26 as shown by FIG. 8 (F). In this cold rolling forming, for example, the third intermediate material 25 is fitted inside an outer diameter side roller which has an inner diameter matching the outer diameter (on the large diameter side) of the third intermediate material 25 and whose inner peripheral surface is constructed by a cylindrical surface. Moreover an inner diameter side roller which has an outer diameter sufficiently smaller than the inner diameter of the third intermediate material 25 and whose outer peripheral surface generating line shape corresponds with the generating line shape of the inner peripheral surface of the fourth intermediate material 26 (with the concave-convex shapes thereof being reversed to each other) is pushed against the inner peripheral surface of the third intermediate material 25. Then, the inner diameter side roller is pushed while rotating against the inner peripheral surface of the third intermediate material 25. Because the outer diameter side roller is supported in a manner which allows only rotation (with the displacement in the radial direction prevented), then with rotation of the inner diameter side roller, the third intermediate material 25 rotates together with the outer diameter side roller. As a result, the generating line shape of the outer peripheral surface of the inner diameter side roller is transferred to the entire periphery of the inner peripheral surface of the third intermediate material 25, and the outer peripheral surface of the third intermediate material 25 is processed into a cylindrical surface.

This rolling process may also be performed by sandwiching part in the circumferential direction of the third intermediate material 25 between a pair of rollers rotating in mutually opposite directions, and applying pressure to the rollers to push them towards each other so as to transfer the shape of the outer peripheral surfaces of the rollers to the inner and outer peripheral surfaces of the third intermediate material 25. In either case, the fourth intermediate material 26 as shown by FIG. 8 (F) is obtained. In this fourth intermediate material 26, the outer peripheral surface is constructed by a cylindrical surface whose outer diameter does not vary substantially in the axial direction, and the inner peripheral surface has an inclined shape in which the inner diameter of the center section in the axial direction is the smallest and the inner diameter increases gradually towards both end sections in the axial direction. The thickness in the radial direction of the both end sections in the axial direction of the fourth intermediate material 26 is approximately 70 percent to 80 percent of the thickness in the radial direction of the cylindrical portion of the second intermediate material 12, and the thickness in the radial direction of a portion having the smallest inner diameter of the center section in the axial direction of the fourth intermediate material 26 is approximately 90 percent to 120 percent of the thickness in the radial direction of the cylindrical portion of the second intermediate material 12.

The thus obtained fourth intermediate material 26 is subjected to the required finishing processes to thereby complete the outer ring 3 which constitutes the double-row angular ball bearing 1, as shown in FIG. 7. That is to say, by shaving away the excess portion of the fourth intermediate material 26 (or the portion that exists in the range of approximately from 10 percent to 25 percent from the surface of the fourth intermediate material 26), the outer ring 3 with the shape indicated by the chain lines in FIG. 8 (F) and FIG. 9 is obtained. Furthermore, the sections corresponding to the double-row outer ring raceways 2 formed in the inner peripheral surface of the outer ring 3, is subjected to processes such as a grinding and super-finishing to enhance the surface characteristics of the double-row outer ring raceways 2.

Incidentally, for the raw material 10 for making the outer ring 3, a column shaped material is used which is made by cutting to predetermined lengths a long piece of material with a circular cross-section that has been extrusion-molded by a steelmaker. The fact that the composition (cleanliness) of the column shaped raw material 10 obtained in this manner is not uniform, that is, in the range of within 40 percent from the center of the raw material 10 (or in the central column section of the raw material 10 which exists from the center to 40 percent in the radial direction), non-metallic inclusions are apt to be contained and thus the cleanliness is low, is already well known as disclosed in JP 2006-250317 (A) and the like. Also known is that, in the range of within 20 percent from the outer peripheral surface of the raw material 10 (or in the cylindrical section of the raw material 10 which exists on the outer peripheral surface side with respect to the range of from the center to 80 percent in the radial direction), the cleanliness is low due to the susceptibility to the presence of oxides and non-metallic inclusions. In other words, in the middle section in the radial direction of the raw material 10 (or in the range of from 40 percent to 80 percent from the center in the radial direction of the raw material 10), there is a metal material having a high degree of cleanliness in the circumferential direction, and there is a metal material having a low degree of cleanliness in the section closer to the center in the radial direction and in the section closer to the outer peripheral surface of the raw material 10. If the metal material with low cleanliness is exposed on a portion of the double-row outer ring raceways 2 provided on the inner peripheral surface of the outer ring 3, that makes rolling contact with the rolling surface of the ball 6 (FIG. 7), ensuring the rolling fatigue life of this portion is difficult.

Taking these circumstances into consideration, and also taking variations in the distribution of oxides and non-metallic inclusions within the material as well as various differences that occur at the time of the manufacturing operation (such as compressive force) into consideration, the metal material present in the range of within 50 percent from the center in the radial direction of the raw material 10 and in the range of within 30 percent from the outer peripheral surface in the radial direction of the raw material 10 is preferably not exposed on at least the portions of the outer ring raceways 2 which make rolling contact with the rolling surface of the ball 6. In other words, on at least the portions of the outer ring raceways 3 which make rolling contact with the rolling surface of the ball 6, preferably the metal material present in the middle cylindrical portion 27 of the raw material 10 (the crosshatched parts in FIG. 8 (A) to FIG. 8 (F), and FIG. 9), is exposed.

Incidentally, when a forging process is used to manufacture the outer ring 3 in which the double-row outer ring raceways 2 are provided at two locations in the axial direction on the inner peripheral surface on both sides of the section having a small inside diameter, exposing the metal material present in the middle cylindrical portion 27 on raceway surfaces of the double-row outer raceway 2 is difficult. For example, when the outer ring 3 shown by the chain line in FIG. 9 is produced by the method such as shown in FIG. 8 (A) to FIG. 8 (F), the center side metal material 28 which is present in the central columnar portion, that is a range of from the center to 50 percent in the radial direction of the raw material 10, the middle metal material 29 which is present in the middle cylindrical portion 27, that is a range of from 50 percent to 70 percent in the radial direction of the raw material 10, and the outer peripheral surface side metal material 30 which is present in the outer peripheral surface side cylindrical portion, that is a range of within 30 percent from the outer peripheral surface in the radial direction of the raw material 10, are distributed throughout the outer ring 3 as shown in FIG. 9. For this outer ring 3, as described above, the fourth intermediate material 26 as shown by the solid line in FIG. 9 is produced by a forging process, after which the fourth intermediate material 26 is shaved off to the state shown by the chain line in FIG. 9, by machining and grinding processes, and completed as the outer ring 3.

In FIG. 9 which shows the fourth intermediate material 26 and the outer ring 3, if the middle metal material 29 present in the middle cylindrical portion 27 shown by the crosshatching is exposed at least at the part of the double-row outer ring raceways 2 which makes rolling contact with the rolling surface of the ball 6, the rolling fatigue life of these double-row outer ring raceways 2 is ensured, which easily ensures the durability of the double-row angular ball bearing 1 which includes this outer ring 3. However, as is clear from FIG. 9, when the outer ring 3 is made by the conventional manufacturing method, the center side metal material 28 of the central columnar portion is exposed on the entire surface of one of the double-row outer ring raceways 2 (the lower outer ring raceway 2 in FIG. 9). For example, the arrows a in FIG. 9 indicate the direction of action of the load applied from the balls 6 to the outer ring raceways 2 (see FIG. 7) in the case where the contact angle of the balls 6 is 40 degrees (the complementary angle of the contact angle relative to the center axis is 50 degrees). If the middle metal material 29 is present at the part indicated by the arrows a on the chain line in FIG. 9 which indicates the cross-sectional shape of the outer ring 3, then the rolling fatigue life of the outer ring raceways 2 can be ensured easily. However in relation to the lower inner ring raceway 2 of FIG. 9, the center side metal material 28 is present in the part on the chain line indicated by the arrows a. Consequently, in conventionally known methods of manufacturing bearing outer rings, the degree of freedom in the design for ensuring the durability of the double-row angular ball bearing 1 is limited.

RELATED LITERATURE

Patent Literature

Patent Literature 1: JP H09-176740 (A)
Patent Literature 2: JP H09-280255 (A)
Patent Literature 3: JP H11-140543 (A)
Patent Literature 4: JP 2002-79347 (A)
Patent Literature 5: JP 2003-230927 (A)
Patent Literature 6: JP 2006-250317 (A)

SUMMARY OF THE INVENTION

Problem to be Solved by Invention

Taking into consideration the above circumstances, even in the case of manufacturing, by plastically deforming a cylindrical material, a bearing outer ring in which the inner diameter of the axial center section on the inner peripheral surface is smaller than the inner diameter of both end sections on the inner peripheral surface and the double-row outer ring raceways are provided at two locations on both sides the section having the smaller inner diameter, the present invention is to realize manufacturing method for a bearing outer ring in which the metal material of the middle cylindrical portion with the highest cleanliness of the raw material can be exposed on the entire sections which become the double-row outer ring raceways.

Means for Solving Problem

The bearing outer ring that is the object of the manufacturing method of the present invention has double-row back-to-back outer-ring raceways in two locations in the axial direction around the inner peripheral surface thereof.

The manufacturing method for manufacturing a bearing outer ring of the present invention basically has steps of:

obtaining a first intermediate material by performing an upsetting process of compressing a metal circular column-shaped raw material in the axial direction so that the outer diameter of the middle section in the axial direction is greater than the outer diameter of both end sections in the axial direction;

obtaining a second intermediate material by performing a simultaneous forward-backward extrusion process or a combination of a forward extrusion process and a backward extrusion process of compressing the center portion of the first intermediate material, such that the second intermediate material has a cylindrical section and a bulkhead portion that is provided on the inner-diameter side of the middle section in the axial direction of the cylindrical section;

obtaining a third intermediate material by performing a punching process of punching out and removing the bulkhead portion of the second intermediate material such that the third intermediate material has a wholly cylindrical shape;

obtaining a fourth intermediate material by performing a rolling process of plastically deforming the inner peripheral surface and the outer peripheral surface of the third intermediate material such that the fourth intermediate material has an outer peripheral surface that is a cylindrical surface with an outer diameter that substantially does not change in the axial direction, and has an inner peripheral surfaces that has a middle section in the axial direction of which the inner diameter is the smallest, and inclined sections that are provided on both sides of the middle section in the axial direction and incline so that the inner diameters thereof gradually increase going toward both end sections in the axial direction; and forming the double-row outer-ring raceways around the inner peripheral surface by a finishing process of cutting away the inner peripheral surface of the fourth intermediate material.

Particularly, in the manufacturing method for manufacturing a bearing outer ring of the present invention, in the simultaneous forward-backward extrusion process or the forward extrusion process, a floating die, which has a peripheral wall section to which an elastic force in the upward direction is applied by an elastic member, and a bottom plate section that is located at the bottom portion of the peripheral wall section and that is provided in the center portion thereof with a circular convex section such that a first cylindrical formation space is formed between the outer peripheral surface of the circular convex section and the inner peripheral surface of the peripheral wall section, is used to compress the center portion of the first intermediate material between the floating die and an extrusion punch and cause the peripheral wall section of the floating die to lower against the elastic force of the elastic member due to friction that acts between the outer peripheral surface of the first intermediate material and the inner peripheral surface of the peripheral wall section when the metal material that is extruded outward in the radial direction due to the compression and the metal material that is located in the portion near the outside in the radial direction of the first intermediate material is caused to move into the first cylindrical formation space located in the forward extrusion direction of the extrusion punch.

In one embodiment of the present invention, the second intermediate material is obtained from the first intermediate material by a simultaneous forward-backward extrusion process. More specifically, the extrusion punch has a distal end section provided in the center portion of the bottom surface thereof having an outer diameter that is smaller than the inner diameter of the peripheral wall section, and by the simultaneous forward-backward extrusion process, the metal material that is extruded outward in the radial direction by the compression and the metal material that is located in the portion closer to the outside in the radial direction of the first intermediate material are respectively caused to move into the first cylindrical formation space that is located in the forward extrusion direction of the extrusion punch and the second cylindrical formation space that is located in between the outer peripheral surface of the distal end section of the extrusion punch and the inner peripheral surface of the peripheral wall section in the backward extrusion direction of the extrusion punch to obtain the second intermediate material that has a cylindrical section and a bulkhead portion that is provided on the inner-diameter side of the middle section in the axial direction of the cylindrical section.

In another embodiment of the present invention, a preliminary intermediate material is obtained from the first intermediate material by the forward extrusion process, and after that, the second intermediate material is obtained from the preliminary intermediate material by a backward extrusion process. More specifically, the extrusion punch is a first extrusion punch having an outer diameter that is substantially the same as the inner diameter of the peripheral wall section, and by the forward extrusion process, causes the metal material that is extruded outward in the radial direction due to the compression, and the metal material that is located in the portion closer to the outside in the radial direction of the first intermediate material to move to the first cylindrical formation space located in the forward extrusion direction of the first extrusion punch, to obtain the preliminary intermediate material that has a circular column section, and a cylindrical one end section in the axial direction having a circular concave section that is provided on one end side in the axial direction of the circular column section and that is open on one end surface in the axial direction of the circular column section.

Next, by a backward extrusion process, the center portion of the preliminary intermediate material is compressed in the axial direction between a die that is cylindrical shaped with a bottom and that has a bottom inside surface having a shape that matches the one end section in the axial direction of the preliminary intermediate material, and a second extrusion punch that has a distal end section that is provided in the center portion of the bottom surface and that has an outer diameter that is smaller than the inner diameter of the die, and causes the metal material that is extruded outward in the radial direction due to the compression, and the metal material that is located in the portion closer to the outside in the radial direction of the preliminary intermediate material to move to a second cylindrical formation space that is located in between the outer peripheral surface of the distal end section of the second extrusion punch and the inner peripheral surface of the die in the backward extrusion direction of the second extrusion punch, to obtain a second intermediate material that has a cylindrical section, and a bulkhead portion that is provided on the inner-diameter side of the middle section in the axial direction of the cylindrical section.

In any of the embodiments of the present invention, when the portion in the range of from 50 percent to 70 percent from the center in the radial direction of the raw material is taken to be a middle cylindrical portion, the outer diameter of the middle cylindrical portion of the raw material becomes essentially the same as the outer diameter of that middle cylindrical portion at both end surfaces in the axial direction of the first intermediate material, and preferably a floating die in which the diameter of the distal end surface of the circular convex section is equal to or greater than the outer diameter of the middle cylindrical portion at both end surfaces in the axial direction of the first intermediate material is used as the floating die.

Moreover, preferably, the axial length of the first intermediate material is equal to or less than 70 percent of the axial length of the raw material. Furthermore, preferably, the thickness in the axial direction of the bulkhead portion of the second intermediate material is equal to or less than 30 percent of the axial length of the first intermediate material.

Effect of Invention

With the manufacturing method for a bearing outer ring of the present invention, the metal material with the highest cleanliness present in the middle cylindrical portion of the raw material is exposed over the entire portion that will become double-row outer-ring raceways that are formed in two locations that are separated in the axial direction and located on the inner peripheral surface on both sides of the portion where the inner diameter is the smallest. Therefore, the rolling fatigue life of the double-row outer-ring raceways is maintained, and the freedom of design for maintaining the durability of a double-row rolling bearing that includes a bearing outer ring having the double-row outer-ring raceways is improved.

In other words, in the case of the present invention, the center portion of the first intermediate material is compressed, and due to this compression, the metal material of the first intermediate material is moved into the first cylindrical formation space that is located in the forward extrusion direction of the extrusion punch, which causes the peripheral wall section of the floating die to lower. Therefore, in the process of plastically deforming the first intermediate material to obtain a second intermediate material having a bulkhead portion formed on the inner-diameter side of the middle section in the axial direction of the cylindrical section, the metal material can be moved approximately uniformly in the axial direction and become symmetrical in the axial direction of the second intermediate material. As a result, highly clean metal material in the middle cylindrical portion is completely exposed over the entire portion that will become the double-row outer-ring raceways.

BRIEF DESCRIPTION OF DRAWINGS

FIG. 6 (A) to FIG. 6 (I) are drawing similar to FIG. 1 (A) to FIG. 1 (F) showing a second example of an embodiment of the present invention.

MODE FOR CARRYING OUT INVENTION

First Example

Figure 1:
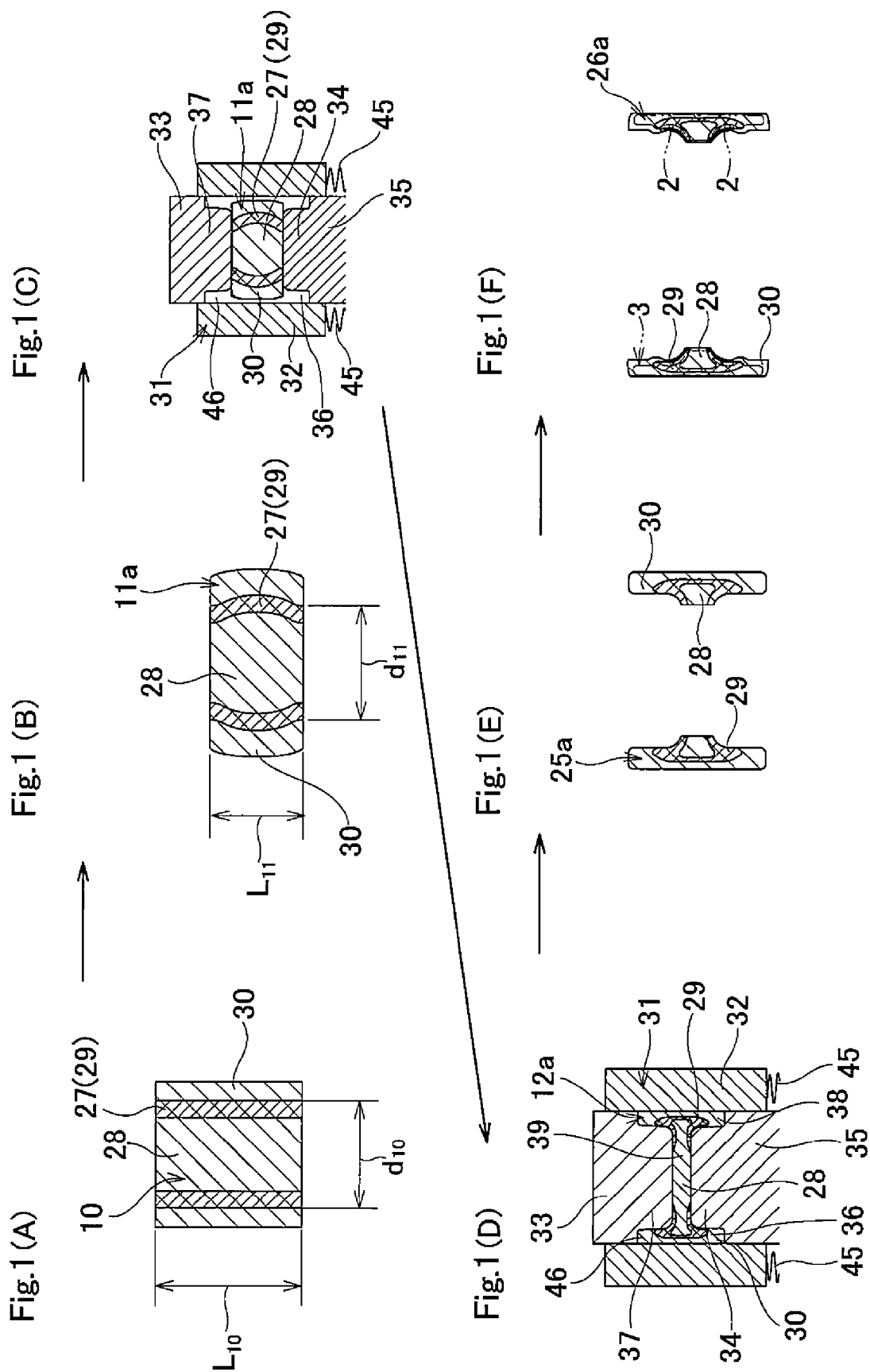
FIG. 1 (A) to FIG. 1 (F) shows a first example of an embodiment of a manufacturing method for a bearing ring member of the present invention, together with the situations where the distribution state of the metal material of the center columnar portion, the metal material of the middle cylindrical portion, and the metal material of the cylindrical portion closer to the outside in the radial direction changes in the processing sequence, showing cross-sectional views of from the raw material to the fourth intermediate material, and the floating die and punch.
Figure 3:
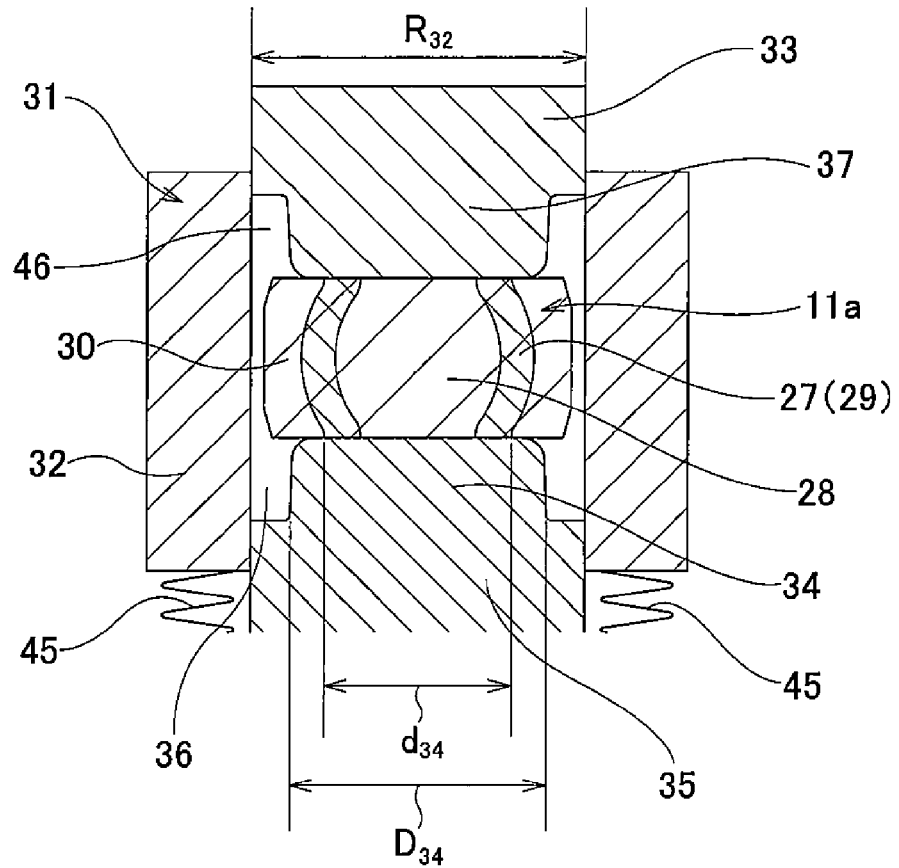
FIG. 3 (A) is an enlarged view of FIG. 1 (C), and FIG. 3 (B) is an enlarged view of FIG. 1 (D).
Figure 3:
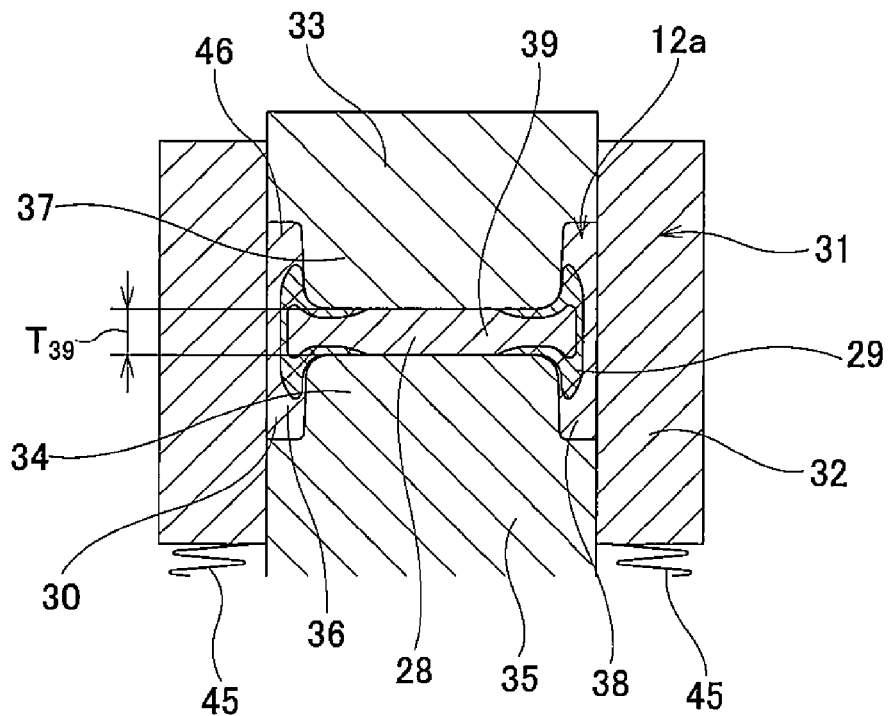
Figure 7:
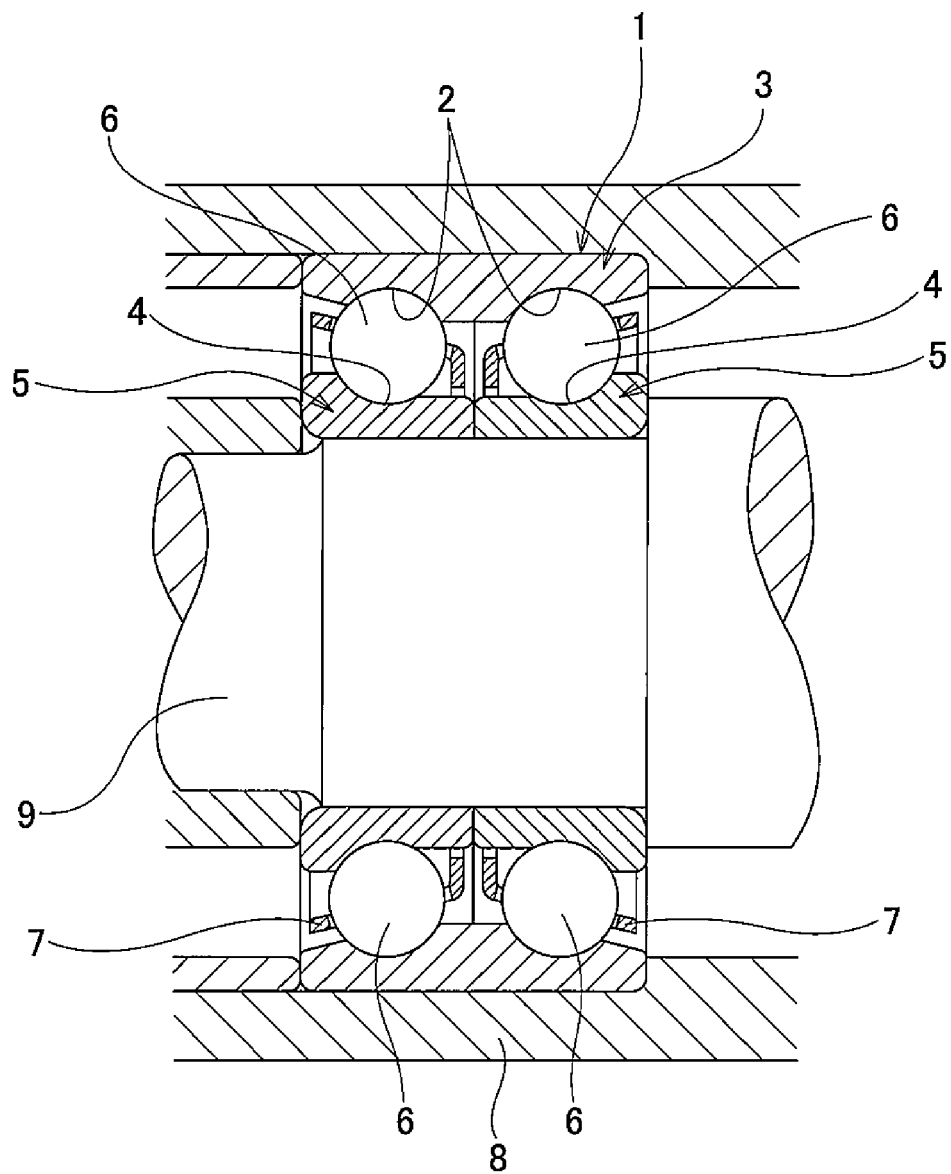
FIG. 7 is a cross sectional view showing an example of a rotating support section provided with a double-row angular rolling bearing having a bearing outer ring to which the manufacturing method of the present invention can be applied.

FIG. 1 (A) to FIG. 3 (B) show a first example of an embodiment of the present invention. In the manufacturing method of this example, a cylindrical raw material 10 made of a metal which can be quench hardened after plastic processing, such as a ferrous alloy like a medium carbon steel, a bearing steel, or a carburized steel is sequentially subjected to plastic processing and punching. The ratio of the diameter to the axial length of the raw material 10 is approximately 5:4 to 5:6. Moreover, normally, in the range of within 40 percent from the center in the radial direction of the raw material and in the range of within 20 percent from the outer peripheral surface in the radial direction of the raw material 10, there is metal material having a low degree of cleanliness, and in the range of from 40 percent to 80 percent from the center in the radial direction of the raw material 10, there is a metal material having a high degree of cleanliness; however, in the present invention, taking into consideration variation in the distribution of oxides or non-metallic inclusions in the raw material and other variations (pressing force and the like) that occur during manufacturing, the range of from 50 percent to 70 percent from the center in the radial direction of the raw material 10 is taken to be a center cylindrical portion where there is surely metal material having a high degree of cleanliness. Then, by way of a first intermediate material 11a shown in FIG. 1 (B), a second intermediate material 12a shown in FIG. 1 (D), and a third intermediate material 25a shown in FIG. 1 (E), a fourth intermediate material 26a shown in FIG. 1 (F) is obtained. Furthermore, the fourth intermediate material 26a is subjected to the required machining and grinding processes to obtain an outer ring 3 which constitutes part of the double-row angular ball bearing 1 as shown in FIG. 7. The steps for processing the raw material 10 into the fourth intermediate material 26a are described in order below. Of the following processes, the upsetting process, the backward extrusion process, and the punching process illustrated by from FIG. 1 (A) to FIG. 1 (E) are basically all performed at hot temperature or warm temperature, and the rolling process illustrated by from FIG. 1 (E) to FIG. 1 (F) is performed at cold temperature. However, where possible, such as when forming a small-scale outer ring 3 using the metal material having superior ductility, all processes can be performed at cold temperature.

Figure 8:
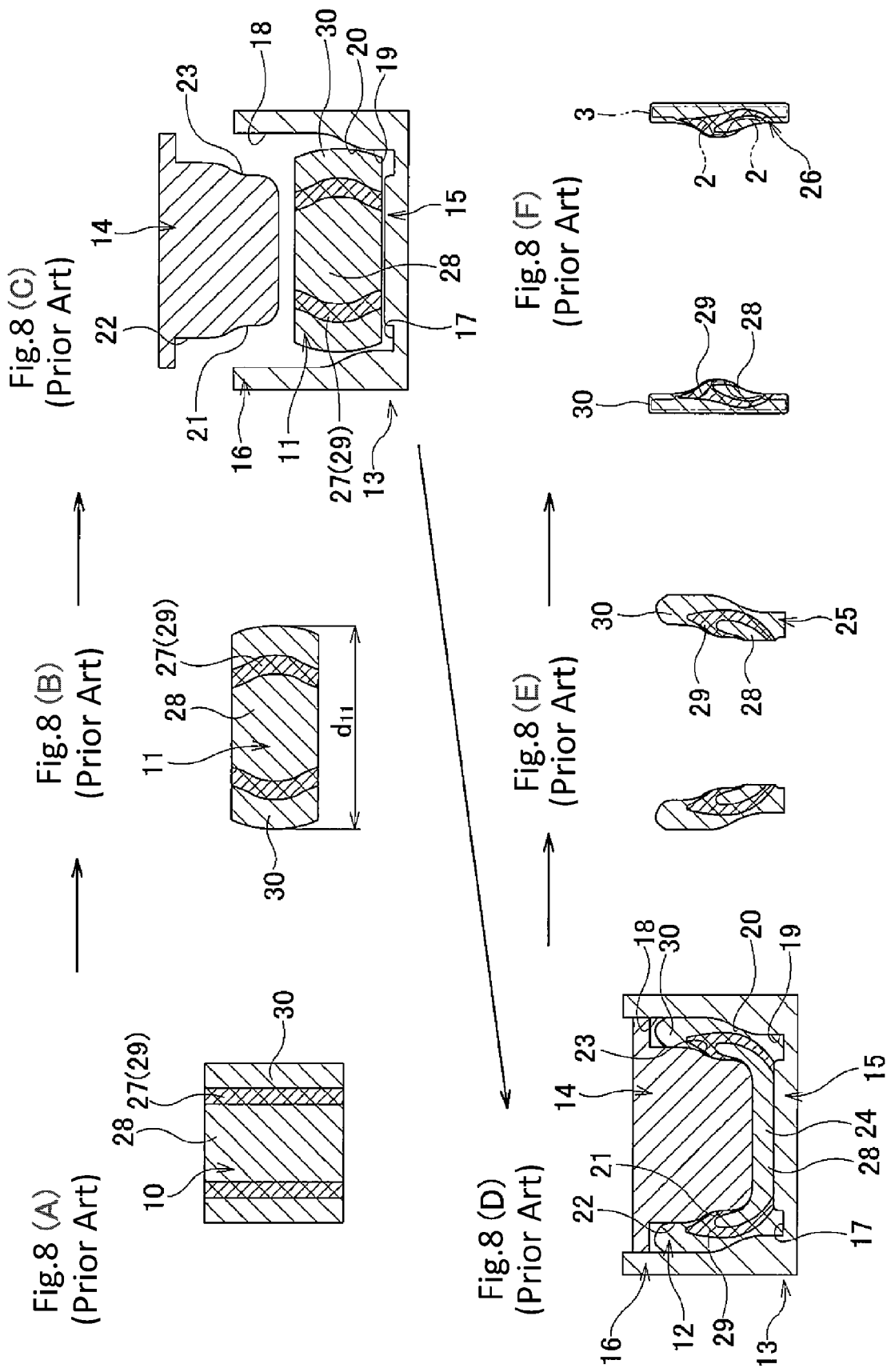
FIG. 8 (A) to FIG. 8 (F) are drawings similar to FIG. 1 (A) to FIG. 1 (F) showing a conventionally known manufacturing method for a bearing outer ring.
Figure 9:
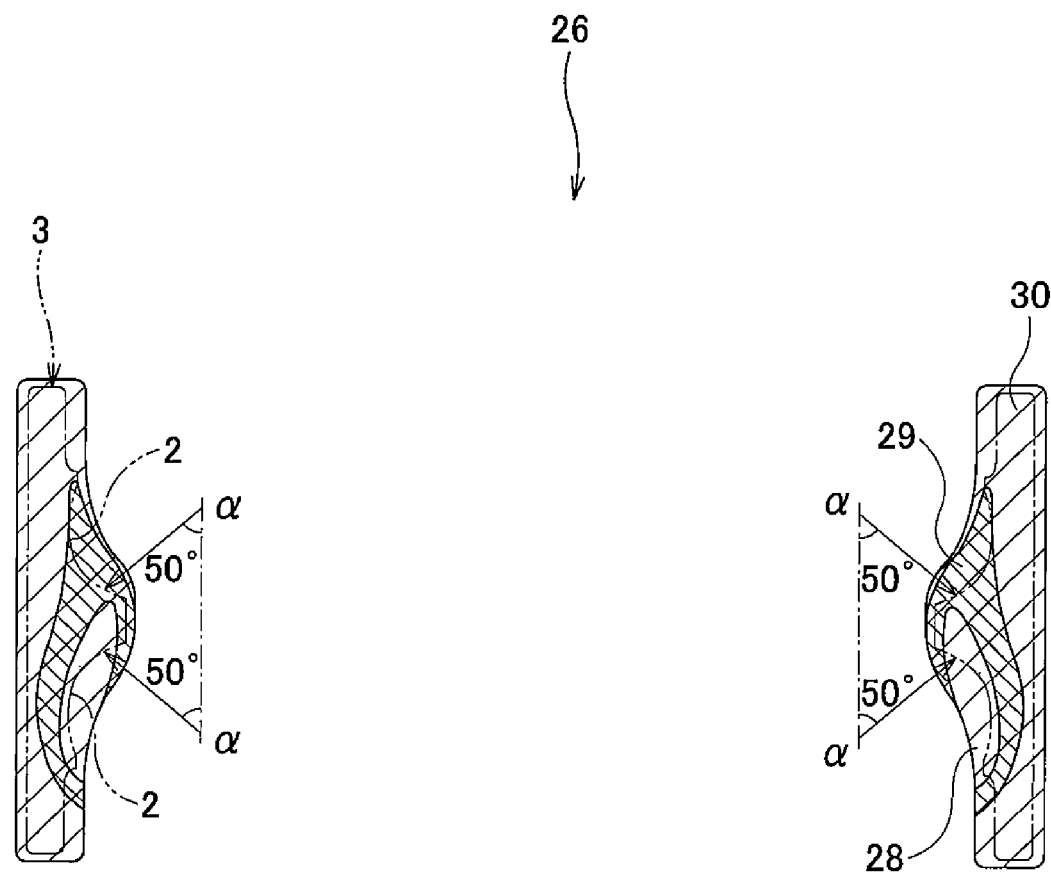
FIG. 9 is a drawing similar to FIG. 2 showing the fourth intermediate material as shown in FIG. 8 (F).

First, in the upsetting process, as shown in from FIG. 1 (A) to FIG. 1 (B), the raw material 10 is compressed in the axial direction to widen its outer diameter, thereby transforming the raw material 10 into the first intermediate material 11a with an expanded center portion in the axial direction. The basic implementation of this upsetting process is similar to the aforementioned upsetting process in the conventional manufacturing process as shown in FIG. 8 (A) to FIG. 8 (B). In other words, by performing the upsetting process where the raw material 10 is compressed between the pressing surfaces of a pair of molds, the beer barrel shaped first intermediate material 11a having a generating line with an arc shape is obtained. The amount of processing (compression deformation amount) of the raw material 10 in this upsetting process is regulated so that the axial length $L_{11}$ of the first intermediate material 11a is 70 percent or less the axial length $L_{10}$ of the raw material 10 ($L_{11} \leq 0.7\ L_{10}$). When the axial length $L_{11}$ of the first intermediate material 11a is longer than 70 percent the axial length $L_{10}$ of the raw material 10, there is a possibility that the movement of the metal material of the first intermediate material will not be able to be properly regulated in the next simultaneous extrusion processing in the forward-backward direction. As a result, it becomes difficult to expose the middle metal material 29 having a high degree of cleanliness that is located in the middle cylindrical portion 27 in the range of from 50 percent to 70 percent from the center in the radial direction of the raw material 10 along the entire portion that will become the double-row outer ring raceways 2. However, when the amount of compressing is excessively large, and the axial length $L_{11}$ of the first intermediate material 11a becomes to short, then in the next simultaneous extrusion process in the forward-backward direction, there is a possibility that when the metal material of the first intermediate material 11a moves outward in the radial direction while the first intermediate material 11a is compressed by the extrusion punch 33, the metal material will not move uniformly to both sides in the extrusion direction of the extrusion punch 33. Therefore, the compression deformation amount is set by design to satisfy the condition above ($L_{11} \leq 0.7\ L_{10}$), and is set in a range so that in the simultaneous extrusion process in the forward-backward direction, movement of the metal material of the first intermediate material can be performed properly.

During the upsetting process, friction force acts between both end surfaces in the axial direction of the raw material 10 and the pressing surfaces of the pair of molds, so at both end portions in the axial direction of the raw material 10, the amount of movement of metal material of the raw material 10, and the amount of movement of the middle metal material 29 of the raw material 10 is kept small. Therefore, at both end surfaces in the axial direction of the first intermediate material 11, the outer diameter $d_{11}$ of the middle cylindrical portion 27 after the upsetting process is nearly the same as the outer diameter $d_{10}$ before the upsetting process ($d_{10} \approx d_{11}$).

Next, the simultaneous forward-backward extrusion process is performed on the first intermediate material 11a described above as illustrated in FIG. 1 (C) to FIG. 1 (D) to obtain a second intermediate material 12a. In this kind of simultaneous forward-backward extrusion process, floating dies 31 and extrusion punch 33 having an inside surface shape that matches the surface shape of the second intermediate material 12a are used to compress in the axial direction the portion of the first intermediate material 11a that is closer to the center in the radial direction, and while moving the metal material of the first intermediate material 11a toward the outside in the radial direction, moves the metal material uniformly to both sides in the direction of extrusion (forward and backward direction) of the punch 33. The floating die 31 has a peripheral wall section 32 having a cylindrical shape and a bottom plate section 35 that is located at the bottom of the peripheral wall section 32. In order that the peripheral wall section 32 lowers when a large downward force is applied, an elastic member 45 such as a spring or hydraulic cylinder applies an elastic force in the upward direction. Moreover, the bottom plate section 35 is provided in the center portion on the top surface with a circular convex section 34 on the die side that has a height of less than ½ the height of the peripheral wall section 32. The circular convex section 34 on the die side has an outer diameter $D_{24}$ that is less than the inner diameter $R_{32}$ of the peripheral wall section 32 ($D_{34}<R_{32}$), and the diameter $d_{34}$ of the distal end surface is equal to or greater than the outer diameter $d_{11}$ ($d_{34}≥d_{11}$), and is preferably greater than the outer diameter $d_{11}$ ($d_{34}>d_{11}$) of the middle cylindrical portion 27 after the upsetting process. The reason for this is that, due to the friction force that acts between the distal end surface of the circular convex section 34 on the die side and the end surface of the first intermediate material 11a, the amount of movement of the metal material of the first intermediate material is regulated, and the middle metal material 29 is exposed over the entire portion that will become the double-row outer-ring raceways 2. When the outer diameter $d_{34}$ is too large, the amount of movement of the middle metal material 29 to the cylindrical section 38 of the second intermediate material 12a is decreased, and there is a possibility that the middle metal material 29 will not be exposed over the entire portion that will become the double-row outer-ring raceways 2. Therefore, the outer diameter $d_{34}$ is set by design to satisfy the condition above ($d_{34}≥d_{11}$) and so that the middle metal material 29 will be exposed over the entire portion that will become the double-row outer-ring raceways 2. Moreover, the distal end surface of the circular convex section 34 on the die side and the cross-sectional shape of the outer peripheral surface thereof are continuous by a partial arc shaped curved surface. The space between the outer peripheral surface of the circular convex section 34 on the die side and the inner peripheral surface of the peripheral wall section 32 is taken to be a cylindrical shaped space 36. The distal end section of the extrusion punch 33 has a circular convex section 37 on the punch side that has a shape in the up-down direction that is an inversion of the shape of the circular convex section 34 on the die side. The circular convex section 37 on the punch side also has a height that is less than ½ the height of the peripheral wall section 32. Preferably, the circular convex section 37 on the punch side also has an outer diameter $D_{37}$ that is less than the inner diameter $R_{32}$ of the peripheral wall section 32 ($D_{37}<R_{32}$), and preferably the diameter $d_{37}$ of the distal end surface thereof is equal to or greater than the outer diameter $d_{11}$ of the middle cylindrical portion 27 after the upsetting process ($d_{37}≥d_{11}$), and more preferably is greater than the outer diameter $d_{11}$ ($d_{37}>d_{11}$). The circular convex section 37 on the punch side does not necessarily need to be regulated in this way. However, by regulating the circular convex section 37 on the punch side in this way, it is definitely possible to expose the middle metal material 29 over the entire portion that will become the double-row outer-ring raceways 2.

In other words, in this example, in the simultaneous forward-backward extrusion process, first, as illustrated in FIG. 1 (C), the first intermediate material 11a is placed on the top surface of the circular convex section 34 on the die side. Then from this state, the extrusion punch 33 is lowered, and the distal end surface of the punch-side circular convex section 37 of the extrusion punch 3 (bottom surface in FIG. 1 (C) and FIG. 1 (D)) presses the first intermediate material 11a toward the top surface of the bottom-plate section 35 of the floating die 31. In this initial extrusion stage, the diameter of the intermediate material 11 expands, and plastically deform toward both sides in the extrusion direction of the extrusion punch 33 along the continuous portion between the distal end surface and the outer peripheral surface of the die-side circular convex section 34 and along the continuous portion between the distal end surface and the outer peripheral surface of the punch-side convex section 37, the continuous portions respectively having the partial arc cross-sectional shape.

By further lowering the extrusion punch 33 after the outer peripheral surface of the first intermediate material 11a has come in contact with the inner peripheral surface of the peripheral wall section 32, the center portion of the first intermediate material 11a is compressed from both sides in the axial direction (up-down direction), and due to the friction force that acts between the outer peripheral surface of the first intermediate material 11a and the inner peripheral surface of the peripheral wall section 32, the peripheral wall section 32 is caused to displace downward against the elastic force of the elastic member 45. The metal material that is pressed outward in the radial direction while being compressed, together with the metal material of the first intermediate material 11a that is closer to the outside in the radial direction, is moved uniformly into the cylindrical formation space 36 that is located in the forward direction (downward direction) of extrusion by the extrusion punch 33, and into the cylindrical formation space 46 in the backward direction (upward direction) of extrusion that is located between the outer peripheral surface of the punch-side circular convex section 37 and the inner peripheral surface of the peripheral wall section 32. Therefore, the elastic force of the elastic member 45 is set to a size such that as the extrusion punch 33 presses the metal material of the first intermediate material 11a, that metal material is moved uniformly toward both sides in the direction of extrusion by the extrusion punch 33. The inner peripheral surface and outer peripheral surface of the metal material that is moved to both sides in extrusion direction of the extrusion punch 33 take on a shape that corresponds to the outer peripheral surface of the extrusion punch 33 and the inside surface (bottom surface and inner peripheral surface) of the floating die 31. As a result, by this simultaneous forward-backward extrusion process, the first intermediate material 11a illustrated in FIG. 1 (C) becomes the second intermediate material 12a having a bulkhead portion 39 on the inner-diameter side of the middle section in the axial direction of the cylindrical section 38 as illustrated in FIG. 1 (D). In this example, the axial thickness $T_{39}$ of the bulkhead portion 39 is equal to or less than 30 percent the axial length $L_{11}$ of the first intermediate material 11a ($T_{39}≤0.3\ L_{11}$). When the axial thickness $T_{39}$ is thicker than 30 percent the axial length $L_{11}$, it is not possible to properly regulate the amount of movement of the metal material of the first intermediate material 11a, so there is a possibility that the middle metal material 29 having a high degree of cleanliness will not be exposed over the entire portion that will become the double-row outer-ring raceways 2, and that in the next punching process, the force required to punch out the bulkhead portion 39 will increase. However, when the axial thickness $T_{39}$ of the bulkhead portion 39 is too thin, as the amount of movement outward in the radial direction of the core metal material 28 in the circular column portion present in from the center up to 50 percent in the radial direction of the first intermediate material 11a increases, there is a possibility that the amount of movement outward in the radial direction of the middle metal material 29 will increase, and that middle metal material 29 will not be exposed over the entire portion that will become the double-row outer-ring raceways 2. Therefore, the axial thickness $T_{39}$ of the bulkhead portion 39 is set by design to satisfy the condition above ($T_{39} \leq 0.3 L_{11}$), and to be within a range that the amount of movement of the center metal material 28 is kept to a suitable amount. The radial thickness of the cylindrical portion of the second intermediate material 12a becomes approximately 10 percent to 20 percent the diameter of the first intermediate material 11a.

Figure 2:
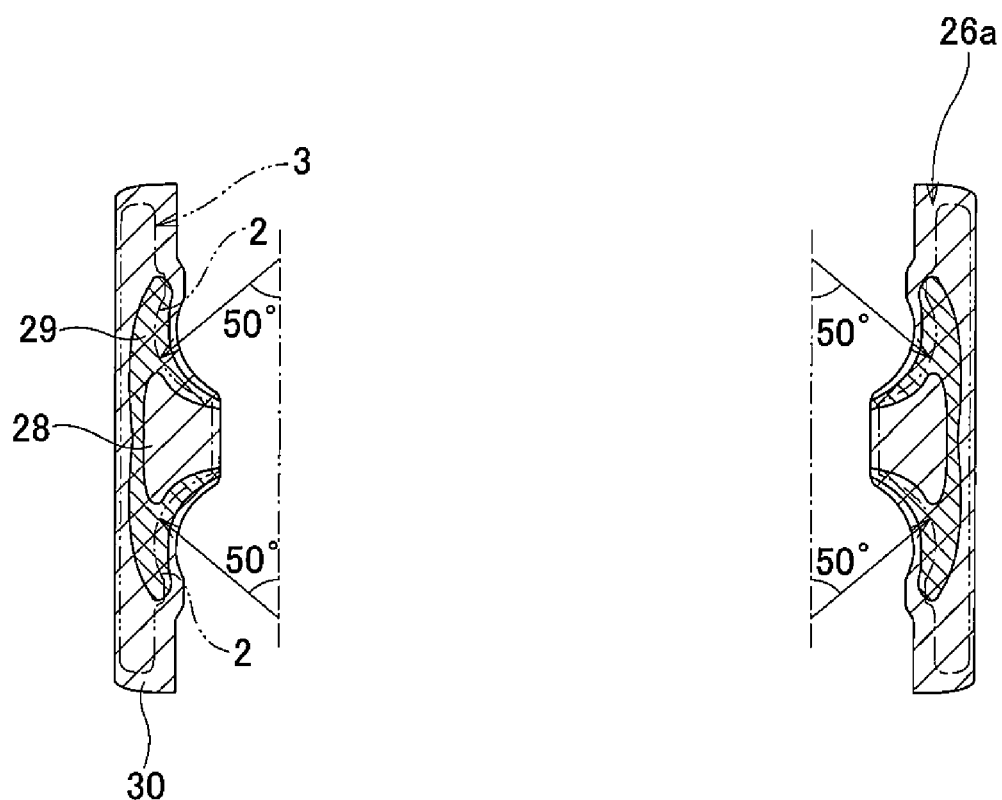
FIG. 2 is a cross sectional view showing the distribution state of the metal material of the center columnar portion, the metal material of the middle cylindrical portion, and the metal material of the cylindrical portion closer to the outside in the radial direction in the fourth intermediate material as shown in FIG. 1 (F).

This second intermediate material 12a is removed from the floating die 31 by the application of upward pressure to the bulkhead portion 39 using a counter punch (not shown in the drawing) or other means, and then is subjected to a punching process and a rolling process similar to the conventional manufacturing method to obtain the fourth intermediate material 26a shown in FIG. 1 (F) and FIG. 2. In the punching process, with the second intermediate material 12a held in the inner peripheral surface of a receiving die (not shown in the drawing), a blanking punch (not shown in the drawing) is pushed against the inside diameter side of the second intermediate material 12a, thereby punching out the bulkhead portion 39. By this punching process, the third intermediate material 25a having an approximately cylindrical shape as shown in FIG. 1 (E) is obtained. Next, in the rolling process, the inner and outer peripheral surfaces of this third intermediate material 25a are subjected to plastic deformation by a pair of rollers (not shown in the drawing) to give a shape matching the peripheral surfaces of the two rollers, thereby obtaining the fourth intermediate material 26a. The radial thickness of both end sections in the axial direction of this fourth intermediate material 26a becomes approximately 70 percent to 80 percent of the radial thickness of the cylindrical portion of the second intermediate material 12a, and the radial thickness of the portion of the middle section in the axial direction of the fourth intermediate material 26a having the smallest inner diameter is approximately 90 percent to 120 percent of the radial thickness of the cylindrical portion of the second intermediate material.

This fourth intermediate material 26a still has thicker walls than the finished outer ring 3 (see the chain line in FIG. 1 (F) and FIG. 2). Thus, the fourth intermediate material 26a is subjected to predetermined machining (turning), heat treatment and grinding processes to obtain the completed outer ring 3. The outer ring 3 has a shape of the fourth intermediate material 26a from which excess thickness (portion of approximately 10 percent to 20 percent from the surface of the fourth intermediate material 26) has been removed. FIG. 1 (A) to FIG. 1 (F), FIG. 3 (A) and FIG. 3 (B) illustrate changes in the distribution state of the center metal material 28, the middle metal material 29, and the outside metal material 30 accompanying of the progress of processes, and FIG. 1 (F) and FIG. 2 show the distribution state of the metal materials 28 to 30 at the fourth intermediate material 26a stage and a cross-sectional view of the finished outer ring 3.

As is clear from FIG. 1 (A) to FIG. 3 (B), according to the manufacturing method of the outer ring 3 of this example, the middle metal material 29 of the middle cylindrical portion 27 shown by the crosshatching in the figure, which has the highest cleanliness of the metal material in the raw material 10 is exposed to at least the portion on which the rolling element load acts, of the double-row outer ring raceways 2 formed at two locations separated in the axial direction on the inner peripheral surface of the outer ring 3. Particularly in this example, the processing from the first intermediate material 11a to the second intermediate material 12a is performed by simultaneous forward-backward extrusion using a floating die 31, so it is possible to make the second intermediate material 12a nearly symmetrical in the axial direction. The reason for this will be explained with reference to FIG. 4 (A) and FIG. 4 (B) in addition to FIG. 1 (A) to FIG. 3 (B).

Figure 4:
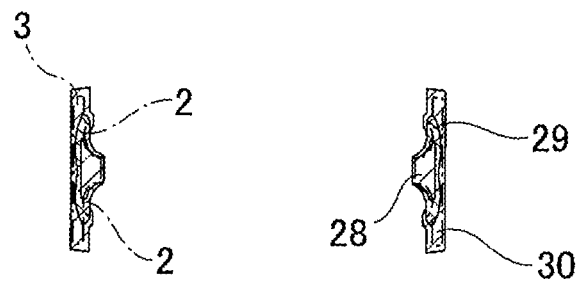
FIG. 4 (A) to FIG. 4(C) are drawings for explaining the problem points when a fixed type die is used, where FIG. 4 (A) corresponds to FIG. 1 (C) and FIG. 4 (B) corresponds to FIG. 1 (D).

In other words, the simultaneous forward-backward extrusion process is performed, as illustrated in FIG. 4 (A) and FIG. 4 (B), using a die 13a that has a bottom plate section 15a that is round and has a die-side circular convex section 34a on the top surface thereof, and a peripheral wall section 16a that raises upward from the outer peripheral edge section of the bottom plate section 15a, with the inner peripheral edge on the bottom end thereof being supported by and fastened to the outer peripheral edge section of the bottom plate section 15a, so moving the metal material of the first intermediate material 11a uniformly to both sides in the extrusion direction of the extrusion punch 33 is difficult. That is, as illustrated in FIG. 4 (B), the amount of movement of the metal material in the forward direction of extrusion by the extrusion punch 33 is less than the amount in the backward direction during the forward extrusion by the extrusion punch 33 due to friction that acts between the outer peripheral surface of the first intermediate material 11a and the inner peripheral surface of the peripheral wall section 16a.

On the other hand, as illustrated in FIG. 1 (C) to FIG. 1 (D), during extrusion by the extrusion punch 33 when using a floating die 31, the peripheral wall section 32 of the floating die 31 is displaced downward (forward extrusion direction of the extrusion punch 33) against the elastic force of the elastic member 45, so it is possible to uniformly move the metal material in both extrusion directions of the extrusion punch 33. As a result, the second intermediate material 12a can be made to be nearly symmetrical in the axial direction.

Figure 5A:
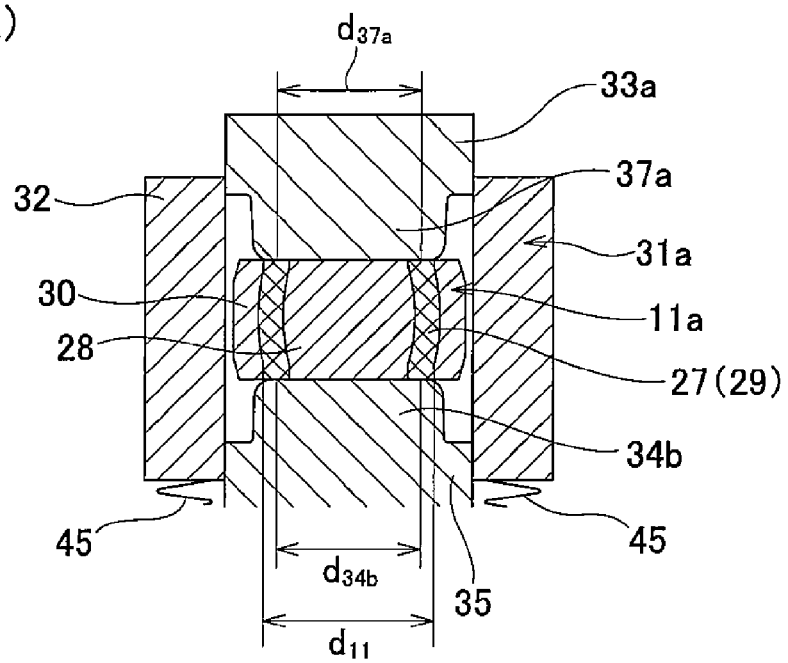
FIG. 5 (A) to FIG. 5 (C) are drawings for explaining the effects of regulating the diameter of the distal end surface of the punch, where FIG. 5 (A) corresponds to FIG. 1 (C), FIG. 5 (B) corresponds to FIG. 1 (D) and FIG. 5 (C) corresponds to FIG. 1 (F).
Figure 5B:
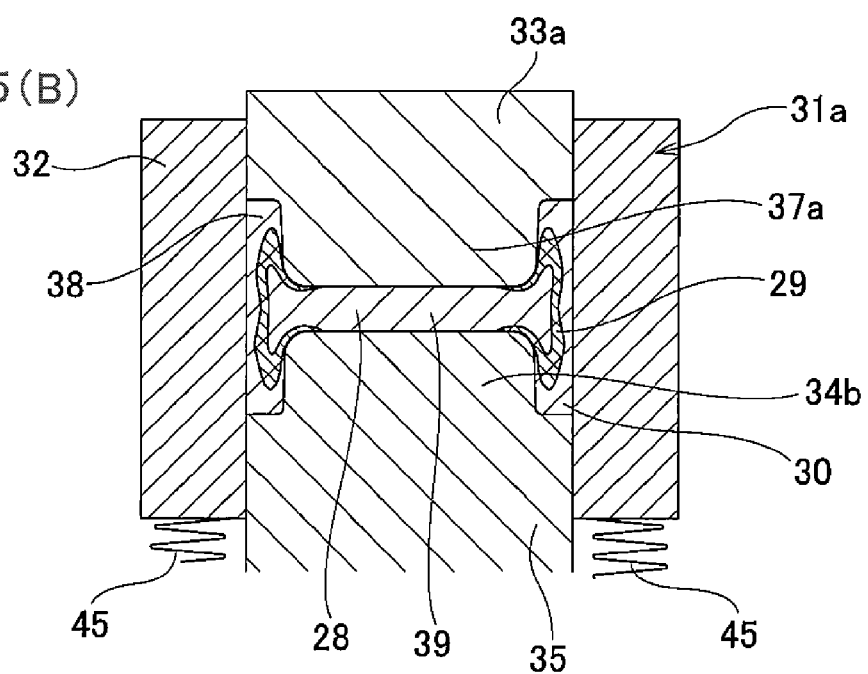
Figure 5C:
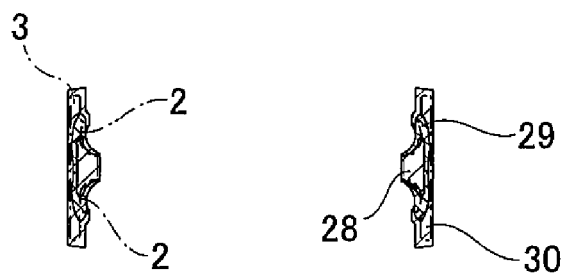

Moreover, in this example, as described above, processing from the first intermediate material 11a to the second intermediate material 12a is performed by simultaneous forward-backward extrusion in a nearly symmetrical state in the axial direction of the first intermediate material 11a and second intermediate material 12a, and of the die-side circular convex section 34 and punch-side circular convex section 37 that press both end surfaces of the first intermediate material 11a from both sides in the axial direction, at least the diameter of the distal end surface of the die-side circular convex section 34, and preferably the diameters of the distal end surfaces of both are equal to or greater than the outer diameter of the middle cylindrical portion 27 of the first intermediate material 11a after the upsetting process. Therefore, as illustrated in FIG. 1 (C) to FIG. 1 (E) and FIG. 2, the middle metal material 29 having a high degree of cleanliness is exposed over the entire portion that will become the double-row outer-ring raceways 2. That is, in this example, friction acts between the distal end surfaces of the die-side circular convex section 34 and the punch-side circular convex section 37 and both end surfaces of the first intermediate material 11a, so the metal material of the first intermediate material 11a on both end surfaces of the first intermediate material 11a hardly moves, and so it is possible to properly regulate the amount of movement of the middle metal material 29. On the other hand, as illustrated in FIG. 5 (A) to FIG. 5 (C), when a die and punch of which the diameters $d_{34b}$, $d_{37a}$ of the distal end surfaces of the die-side circular convex section 34b and punch-side circular convex section 37a are smaller than the outer diameter $d_{11}$ of the middle cylindrical portion 27 after the upsetting process are used as the floating die 31a and extrusion punch 33a that are used in the simultaneous forward-backward extrusion process, it is not possible to properly regulate the amount of movement of the middle metal material 29, and as illustrated in FIG. 5 (B), the middle metal material 29 moves a lot in the outward radial direction. As a result, the middle metal material 29 having a high degree of cleanliness is not exposed over the entire portion that will become the double-row outer-ring raceways 2, and the amount of machining in the finishing process increases, so the manufacturing cost of the outer ring 3 increases.

As described above, with the manufacturing method of a bearing outer ring of this example, it is possible to expose the highly clean middle metal material 29 over the entire portion that will become the double-row outer-ring raceways 2, and to sufficiently maintain the rolling fatigue life of the double-row outer-ring raceways 2. Furthermore, with the manufacturing method of a bearing outer ring of this example, the degree of freedom of design for maintaining the durability of a rolling bearing unit for wheel support, including the outer ring 3 that has double-row outer-ring raceways 2, is further improved.

Second Example

FIG. 6 (A) to FIG. 6 (I) illustrate a second example of an embodiment of the present invention. In this example, instead of the simultaneous forward-backward extrusion process that was performed in the first example of an embodiment as illustrated in FIG. 1 (C) to FIG. 1 (D), a forward extrusion process as illustrated in FIG. 6 (C) to FIG. 6 (D), and a backward extrusion process as illustrated in FIG. 6 (E) to FIG. 6 (F) are performed. In this example, except for employing a forward extrusion process and a backward extrusion process, the manufacturing method is the same as that in the first example of the embodiment.

In the first example of the embodiment, simultaneous forward-backward extrusion was performed on a beer barrel shaped first intermediate material 11a, and by uniformly moving the metal material of the that first intermediate material 11a to both sides in the extrusion direction of the extrusion punch 33, a second intermediate material was obtained. However, in the first example of the embodiment, when the friction that acts between the outer peripheral surface of the first intermediate material 11a and the inner peripheral surface of the peripheral wall section 32 of the floating die 31 becomes excessively large, it is possible to become difficult to uniformly move the metal material. In other words, when the friction that acts between the outer peripheral surface of the first intermediate material 11a and the inner peripheral surface of the peripheral wall section 32 becomes excessively large, the amount of movement of metal material in the forward direction of extrusion by the extrusion punch 33 becomes smaller than the amount of movement of metal material in the backward direction of extrusion by the extrusion punch 33. When pressing the punch 33 with a large force, it is possible to force and spread the metal material into the entire cylindrical formation space 36 in the forward direction of extrusion, however, the size of the extrusion machine becomes large, and there is a possibility that the part of the metal material will enter into minute gaps between the outer peripheral surface of the extrusion punch 33 and the inner peripheral surface of the peripheral wall section 32, causing burrs to be formed in those portions. The size of the friction differs depending on the material properties of the metal material of the first intermediate material 11a, and the characteristics of the inner peripheral surface of the peripheral wall section 32 of the floating die 31.

On the other hand, in this example, forward extrusion is performed on the first intermediate material 11a illustrated in FIG. 6 (B), and processed to obtain the preliminary intermediate material 40 illustrated in FIG. 6 (D). In this kind of forward extrusion process, a floating die 31 and first extrusion punch 41 are used to compress the portion closer to the center in the radial direction of the first intermediate material 11a in the axial direction, and cause the metal material to move in the forward extrusion direction (downward) of the extrusion punch 33 while causing the metal material to move outward in the radial direction. The floating die 31, as in the case of that in the first example of the embodiment (see FIG. 1 (C) and FIG. 1 (D)), is cylindrical in shape, and so as to lower when a large downward force is applied, has: a peripheral wall section 32 to which an elastic force in the upward direction is applied by an elastic member 45; and a bottom plate section 35 that is located in the bottom portion of the peripheral wall section 32, and in the center portion thereof is provided with a die-side circular convex section 34 having a height dimension that is less then ½ the height dimension of the peripheral wall section. On the other hand, the first extrusion punch 41 has a distal end surface that is a flat surface, and the outer diameter thereof is practically the same as the inner diameter of the peripheral wall section 32. More specifically, the outer diameter of the first extrusion punch 41 is a little smaller than the inner diameter of the peripheral wall section 32 in order to provide a minute ring-shaped gap that allows displacement in the axial direction of the inner-diameter side of the peripheral wall section 32.

In the forward extrusion process, first, as illustrated in FIG. 6 (C), the first intermediate material 11a is placed on the top surface of the die-side circular convex section 34. Then, from this state, the first extrusion punch 41 is lowered, and the distal end surface of the first extrusion punch 41 presses the first intermediate material 11a toward the top surface of the bottom plate section 35 of the floating die 31. In this initial stage of extrusion, the first intermediate material 11a plastically deforms, while the diameter of the first intermediate material expands, in the forward extrusion direction (downward direction) of the first extrusion punch 41 along the continuous portion between the distal end surface and the outer peripheral surface of the die-side circular convex section 34.

Then, by further lowering the first extrusion punch 41 after the outer peripheral surface of the first intermediate material 11a has come in contact with the inner peripheral surface of the peripheral wall section 32, the center portion of the first intermediate material 11a is compressed from below, and the peripheral wall section 32 is caused to displace downward against the elastic force of the elastic member 45 due to friction that acts between the outer peripheral surface of the first intermediate material 11a and the inner peripheral surface of the peripheral wall section 32. The metal material that is extruded outward in the radial direction while being compressed, together with the metal material that exists in the portion closer to the outside in the radial direction of the first intermediate material 11a, is moved into the cylindrical formation space 36 that is located in the forward extrusion direction (downward direction) of the first extrusion punch 41. The inner peripheral surface and outer peripheral surface of the metal material that is moved in the forward extrusion direction of the first extrusion punch 41 in this way takes on a shape that matches the shape of the cylindrical formation space 36 that is formed by the inner peripheral surface of the peripheral wall section 32 and the outer peripheral surface of the die-side circular convex section 34. As a result, through this forward extrusion process, the first intermediate material 11a illustrated in FIG. 6 (B) becomes the preliminary intermediate material 40 that has a circular concave section 43 provided on one end surface (bottom surface) in the axial direction of the circular column section 42 as illustrated in FIG. 6 (D). The preliminary intermediate material 40 is removed from the floating die 31 by pressing the bottom surface of the circular concave section 43 by a counter punch (not illustrated in the figure).

Next, by performing a backward extrusion process on the preliminary intermediate material 40 as illustrated in FIG. 6 (E) to FIG. 6 (F), a second intermediate material 12b is obtained. In this kind of backward extrusion process, a die 13b and a second extrusion punch 44 are used to compress the portion closer to the center in the radial direction of the preliminary intermediate material 40 in the axial direction, and cause the metal material to move in the backward extrusion direction (upward direction) of the second extrusion punch 44 while also causing the metal material to move outward in the radial direction. The die 13b is cylindrical shaped with a bottom, and has a round bottom plate section 15b and a peripheral wall section 16b that rises upward from the outer peripheral edge section of the bottom plate section 15b. A die-side circular convex section 34b that has the same shape as the die-side circular convex section 34 that is provided on the bottom plate section 35 of the floating die 31 is provided in the center portion of the top surface of the bottom plate section 15b. Moreover, the second extrusion punch 44 has a shape that is the same as the extrusion punch 33 used in the manufacturing method in the first example of the embodiment (see FIG. 1 (C) and FIG. 1 (D)), and has a punch-side circular convex section 37b provided on the distal end surface thereof that has a shape that is an inversion in the up-down direction of the shape of the die-side circular convex section 34b.

In this backward extrusion process, first, as illustrated in FIG. 6 (E), the preliminary intermediate material 40 is set inside the die 13 with the circular convex section 43 facing downward. Then, from this state, the second extrusion punch 44 is lowered and the distal end surface of the punch-side circular convex 37b of the second extrusion punch 44 (bottom surface in FIG. 6 (E) and FIG. 6 (F)) presses the preliminary intermediate material 40 toward the top surface of the bottom plate section 15b of the die 13b. While being pressed, the center portion of the preliminary intermediate material 40 is compressed in the axial direction, and the metal material that is extruded outward in the radial direction due to this compression, and the metal material that is located in the portion closer to the outside in the radial direction of the preliminary intermediate material 40 are caused to move in the backward extrusion direction (upward direction) of the second extrusion punch 44. The inner peripheral surface and outer peripheral surface of the metal material that is moved in the backward extrusion direction of the second extrusion punch 44 in this way takes on a shape that matches the outer peripheral surface of the second extrusion punch 44 and the inner peripheral surface of the peripheral wall section 16b of the die 13b. Through this kind of backward extrusion process, the preliminary intermediate material 40 illustrated in FIG. 6 (D) becomes the second intermediate material 12 that has a bulkhead portion 39 provided on the inner diameter side of the middle section in the axial direction of the cylindrical section 38 as illustrated in FIG. 6 (G). As in the case of the first example of the embodiment, after the punching process illustrated in FIG. 6 (G) to FIG. 6 (H) and the rolling process illustrated in FIG. 6 (H) to FIG. 6 (I) is performed on the second intermediate material 12b, the shape illustrated by the chain line in FIG. 6 (I) is cut away by a further finishing process to obtain an outer ring 3 for a double-row ball bearing.

In this example, regardless of friction resistance that acts between the metal material of the first intermediate material 11a and the inner peripheral surface of the floating die 3, the first intermediate material 11a can be processed to obtain a second intermediate material 12b that has a shape that is nearly symmetrical in the axial direction. Moreover, as can be clearly seen from FIG. 6 (G) and FIG. 6 (I), the middle metal material that has a high degree of cleanliness is exposed over the entire portion that will become the double-row outer-ring raceways 2. Therefore, as in the case of the first example of the embodiment, it is possible to sufficiently maintain the rolling fatigue life of the double-row outer-ring raceways 2, and improve the freedom of design for maintaining the durability of a rolling bearing unit for wheel support that includes the outer ring 3 that has the double-row outer-ring raceways 2. Moreover, in this example, it is possible to perform forward extrusion and backward extrusion without having to invert the up-down direction of the preliminary intermediate material 40 during the manufacturing process, so it is possible to keep manufacturing costs of the outer ring 3 from increasing needlessly.

INDUSTRIAL APPLICABILITY OF INVENTION

In the above examples of the embodiment, the description has been for the case where an outer ring 3 constituting a double-row angular ball bearing 1 is made by the manufacturing method of the present invention. In contrast, the manufacturing method for a bearing outer ring of the present invention may also be applied to the case of making an outer ring constituting a double-row angular tapered roller bearing. In this case, considering the width of the double-row outer ring raceways formed on the inner peripheral surface of the outer ring, the machining allowance in the finishing processes and the like, the shape of the die (floating die) and extrusion punch are devised.

EXPLANATION OF REFERENCE NUMBERS

1 Double-row angular ball bearing
2 Outer ring raceway
3 Outer ring
4 Inner ring raceway
5 Inner ring
6 Ball
7 Cage
8 Housing
9 Rotating shaft
10 Raw material
11, 11a First intermediate material
12, 12a, 12b Second intermediate material
13, 13,a, 13b Die
14 Punch
15, 15a, 15b Bottom plate portion
16, 16a, 16b Peripheral wall portion
17 Annular groove
18 Inner periphery large diameter portion
19 Inner periphery small diameter portion
20 Inner periphery inclined portion
21 Outer periphery small diameter portion
22 Outer periphery large diameter portion 23 Outer periphery inclined portion
24 Base portion
25, 25a, 25b Third intermediate material
26, 26a, 26b Fourth intermediate material
27 Middle cylindrical portion
28 Center metal material
29 Middle metal material
30 Outside metal material
31, 31a Floating die
32 Peripheral wall portion
33, 33a Extrusion punch
34, 34a, 34b Die-side circular convex section
35 Bottom plate section
36 Cylindrical formation space
37, 37a, 37b Punch-side circular convex section
38 Cylindrical section
39 Bulkhead portion
40 Preliminary intermediate material
41 First extrusion punch
42 Circular column section
43 Circular concave section
44 Second exclusion punch
45 Elastic member
46 Formation space

What is claimed is:

1. A method for manufacturing a bearing outer ring having double-row back-to-back outer-ring raceways in two locations in an axial direction around an inner peripheral surface thereof, the method comprising steps of:

obtaining a first intermediate material by performing an upsetting process of compressing a metal circular column-shaped raw material in an axial direction thereof so that the first intermediate material has a middle section between end sections in an axial direction thereof and the middle section has an outer diameter that is greater than an outer diameter of each of the end sections;

obtaining a second intermediate material by performing a simultaneous forward-backward extrusion process or a combination of a forward extrusion process and a backward extrusion process of compressing a center portion of the first intermediate material, such that the second intermediate material comprises a cylindrical section having a middle section in an axial direction thereof and a bulkhead portion that is provided on an inner-diameter side of the middle section of the cylindrical section;

obtaining a third intermediate material by performing a punching process of punching out and removing the bulkhead portion of the second intermediate material such that the third intermediate material has a wholly cylindrical shape;

obtaining a fourth intermediate material by performing a rolling process of plastically deforming an inner peripheral surface and an outer peripheral surface of the third intermediate material such that the fourth intermediate material has an outer peripheral surface that is a cylindrical surface with an outer diameter that substantially does not change in an axial direction of the fourth intermediate material, and has an inner peripheral surface that comprises a middle section between end sections in the axial direction of the fourth intermediate material where an inner diameter of the inner peripheral surface is smallest, and the middle section defines and separates inclined sections in the axial direction that incline so that an inner diameter of each of the inclined sections gradually increases toward an adjacent one of the end sections in the axial direction; and forming double-row outer-ring raceways around the inner peripheral surface of the fourth intermediate material by a finishing process of cutting away the inner peripheral surface of the fourth intermediate material;

in the simultaneous forward-backward extrusion process or the forward extrusion process, a floating die, which comprises a peripheral wall section to which an elastic force in a backward direction is applied by an elastic member, and a bottom plate section that is located at a bottom portion of the peripheral wall section and that is provided in a center portion thereof with a circular convex section such that a first cylindrical formation space is formed between an outer peripheral surface of the circular convex section and an inner peripheral surface of the peripheral wall section, wherein the compressing of the center portion of the first intermediate material is between the floating die and an extrusion punch and causes the peripheral wall section of the floating die to lower against the elastic force of the elastic member due to friction that acts between the outer peripheral surface of the first intermediate material and the inner peripheral surface of the peripheral wall section when a metal material that is extruded outward in a radial direction of the first intermediate material due to the compressing of the center portion of the first intermediate material and a metal material that is located in a portion closer to an outside in the radial direction of the first intermediate material is caused to move into the first cylindrical formation space located in a forward extrusion direction of the extrusion punch.

2. The method for manufacturing a bearing outer ring according to claim 1, wherein the extrusion punch comprises a distal end section provided in a center portion of a bottom surface thereof having an outer diameter that is smaller than an inner diameter of the peripheral wall section of the floating die, and by the simultaneous forward-backward extrusion process, the metal material that is extruded outward in the radial direction of the first intermediate material by the compressing of the center portion of the first intermediate material and the metal material that is located in the portion closer to the outside in the radial direction of the first intermediate material are respectively caused to move into the first cylindrical formation space that is located in the forward extrusion direction of the extrusion punch, and a second cylindrical formation space that is located in between an outer peripheral surface of the distal end section of the extrusion punch and the inner peripheral surface of the peripheral wall section of the floating die in a backward extrusion direction of the extrusion punch to obtain the second intermediate material.

3. The method for manufacturing a bearing outer ring according to claim 1, wherein the extrusion punch is a first extrusion punch having an outer diameter that is substantially the same as the inner diameter of the peripheral wall section of the floating die, and by the forward extrusion process, causes the metal material that is extruded outward in the radial direction of the first intermediate material due to the compressing of the center portion of the first intermediate material, and the metal material that is located in the portion closer to the outside in the radial direction of the first intermediate material to move to the first cylindrical formation space located in the forward extrusion direction of the first extrusion punch, to obtain a preliminary intermediate material that comprises a circular column section, and a cylindrical one end section in an axial direction of the preliminary intermediate material having a circular concave section that is provided on one end side of the preliminary intermediate material in the axial direction of the preliminary intermediate material and that is open on one end surface of the preliminary intermediate material in the axial direction of the preliminary intermediate material;

next, by a backward extrusion process, a center portion of the preliminary intermediate material is compressed in the axial direction of the preliminary intermediate material between a die that is cylindrical shaped with a bottom and that comprises a bottom inside surface having a shape that matches the one end section in the axial direction of the preliminary intermediate material, and a second extrusion punch that has a distal end section that is provided in a center portion of a bottom surface thereof and that has an outer diameter that is smaller than an inner diameter of the die, and causes the metal material that is extruded outward in the radial direction of the first intermediate material due to the compressing of the center portion of the first intermediate material, and the metal material that is located in the portion closer to the outside in a radial direction of the preliminary intermediate material to move to a second cylindrical formation space that is located between an outer peripheral surface of the distal end section of the second extrusion punch and an inner peripheral surface of the die in a backward extrusion direction of the second extrusion punch, to obtain the second intermediate material.

4. The method for manufacturing a bearing outer ring according to claims 1, wherein when the portion in a range of from 50 percent to 70 percent from a center in a radial direction of the raw material is taken to be a middle cylindrical portion, an outer diameter of the middle cylindrical portion of the raw material becomes essentially the same as an outer diameter of the middle cylindrical portion at end surfaces in the axial direction of the first intermediate material, and, as the floating die, a floating die in which a diameter of a distal end surface of the circular convex section thereof is equal to or greater than the outer diameter of the middle cylindrical portion at the end surfaces in the axial direction of the first intermediate material is used.

5. The method for manufacturing a bearing outer ring according to claim 1, wherein an axial length of the first intermediate material is equal to or less than 70 percent of an axial length of the raw material.

6. The method for manufacturing a bearing outer ring according to claim 1, wherein a thickness of the bulkhead portion of the second intermediate material in the axial direction thereof is equal to or less than 30 percent of an axial length of the first intermediate material.

* * * * *